(12) United States Patent
Iellimo (10) Patent No.: US 10,736,415 B1
(45) Date of Patent: Aug. 11, 2020

(54) FORMED SUPPORT MEMBER WITH TAB SECURING FEATURE

(71) Applicant: Frazier Industrial Company, Long Valley, NJ (US)

(72) Inventor: Domenick Iellimo, Forked River, NJ (US)

(73) Assignee: Frazier Industrial Company, Long Valley, NJ (US)

( * ) Notice: Subject to any disclaimer, the term of this patent is extended or adjusted under 35 U.S.C. 154(b) by 0 days.

(21) Appl. No.: 16/518,061

(22) Filed: Jul. 22, 2019

(51) Int. Cl.
*A47B 47/00* (2006.01)
*B65G 1/02* (2006.01)
*A47B 96/02* (2006.01)
*A47B 47/02* (2006.01)

(52) U.S. Cl.
CPC ...... *A47B 47/0058* (2013.01); *A47B 47/0041* (2013.01); *A47B 47/0083* (2013.01); *A47B 47/027* (2013.01); *A47B 47/028* (2013.01); *A47B 96/021* (2013.01); *B65G 1/02* (2013.01)

(58) Field of Classification Search
CPC . A47B 47/0058; A47B 47/027; A47B 96/021; A47B 96/1441; A47B 47/0041; A47B 47/0083; A47B 47/021; A47B 47/028; A47B 57/50; A47B 57/402; A47B 57/22; A47B 57/487; A47B 57/40; A47B 57/425; A47B 57/58; A47B 57/00; A47B 57/16; A47B 96/06; A47B 96/00; A47B 96/02; A47B 96/14; A47B 57/06; A47B 57/08; A47B 57/30; A47B 57/32; A47B 57/34; A47B 57/48; A47B 57/482; A47B 57/485; A47B 96/024; A47B 96/028; A47B 96/067; A47B 47/0025; A47B 47/024; A47B 47/045; A47B 57/20; A47B 57/38; A47B 57/404; A47B 57/406; A47B 96/1416; A47F 5/01; A47F 5/13; A47F 5/101; A47F 5/132; A47F 5/14
USPC ....... 211/191, 192, 134, 182, 183, 189, 187, 211/186, 190, 193; 248/214, 220.21, 248/225.21, 300

See application file for complete search history.

(56) References Cited

U.S. PATENT DOCUMENTS

| | | | | |
|---|---|---|---|---|
| 2,918,176 A * | 12/1959 | Bell | ...................... | A47B 47/028 211/191 |
| 2,960,238 A * | 11/1960 | Park | ...................... | A47B 47/027 211/134 |
| 2,963,170 A | 12/1960 | Lori et al. | | |
| 3,142,386 A * | 7/1964 | Skubic | .................. | A47B 57/402 211/191 |
| 3,268,089 A * | 8/1966 | Hall | ...................... | A47B 96/021 211/153 |

(Continued)

*Primary Examiner* — Jennifer E. Novosad
(74) *Attorney, Agent, or Firm* — Dilworth & Barrese, LLP (57) ABSTRACT

A formed support member that is structurally steady and easy to manufacture is disclosed herein. The formed support member comprises a downwardly facing U-shaped body, a first flat end, a first securing tab having one end integrally connected to the first flat end and another end extended downwardly to receive at least partially a first support surface of a first supporting beam, a second flat end, and a second securing tab having one end integrally connected to the second flat end and another end extended downwardly to receive at least partially a second support surface of a second supporting beam.

19 Claims, 5 Drawing Sheets

(56) References Cited

U.S. PATENT DOCUMENTS

| | | | | |
|---|---|---|---|---|
| 3,349,924 A * | 10/1967 | Maurer | A47F 7/0042 | 211/41.1 |
| 3,556,306 A * | 1/1971 | Shell | A47B 96/027 | 211/90.02 |
| 3,563,391 A * | 2/1971 | Weltha | H05K 7/1418 | 211/41.17 |
| 3,584,904 A * | 6/1971 | Lickliter | E04B 9/122 | 403/252 |
| 3,846,944 A * | 11/1974 | Lambert | A47B 47/021 | 52/236.3 |
| 4,048,059 A * | 9/1977 | Evans | A47B 96/024 | 108/155 |
| 4,078,664 A * | 3/1978 | McConnell | A47B 96/00 | 108/159 |
| 4,261,470 A * | 4/1981 | Dolan | F16B 12/36 | 108/55.1 |
| 4,285,436 A | 8/1981 | Konstant et al. | | |
| 4,293,076 A * | 10/1981 | Collin | B65D 85/185 | 206/289 |
| 4,665,838 A * | 5/1987 | Minshall | A47B 47/021 | 108/157.13 |
| 4,801,026 A * | 1/1989 | Andersson | A47B 96/00 | 211/183 |
| 4,955,490 A * | 9/1990 | Schafer | A47B 57/581 | 211/187 |
| 5,279,431 A * | 1/1994 | Highsmith | B65G 1/02 | 211/187 |
| 5,310,066 A * | 5/1994 | Konstant | A47B 47/022 | 108/109 |
| 5,415,301 A * | 5/1995 | Bruton | A47B 96/1416 | 211/183 |
| 5,628,415 A * | 5/1997 | Mulholland | A47B 47/027 | 211/186 |
| 6,039,192 A * | 3/2000 | Hollander | A47B 96/021 | 211/186 |
| 6,105,798 A * | 8/2000 | Gruber | B65G 1/023 | 211/151 |
| 6,123,154 A * | 9/2000 | MacDonald, III | A62C 35/68 | 169/16 |
| 6,151,858 A | 11/2000 | Ruiz et al. | | |
| 6,173,846 B1 * | 1/2001 | Anderson | A47B 47/027 | 211/183 |
| 6,450,350 B1 * | 9/2002 | Krummell, Jr. | A47B 47/027 | 211/183 |
| 6,578,720 B1 * | 6/2003 | Wang | A47F 5/0093 | 211/126.15 |
| 7,614,511 B2 * | 11/2009 | Konstant | A47B 47/021 | 211/189 |
| 7,641,063 B2 * | 1/2010 | Wishart | A47B 47/027 | 211/189 |
| 7,779,593 B2 | 8/2010 | Jahn et al. | | |
| 7,857,152 B2 * | 12/2010 | Smith | A47F 5/01 | 211/181.1 |
| 7,891,507 B2 * | 2/2011 | Shetler | A47B 55/00 | 211/135 |
| D637,427 S * | 5/2011 | Troyner | D6/705.6 | |
| 8,443,992 B2 * | 5/2013 | Lawson | A47B 47/028 | 211/187 |
| 9,027,767 B2 * | 5/2015 | Buckley | A47F 5/00 | 211/134 |
| 9,215,931 B1 * | 12/2015 | Offerman | A47B 96/024 | |
| 9,290,322 B2 * | 3/2016 | Heijmink | A47B 47/0058 | |
| 9,375,102 B2 * | 6/2016 | Troyner | A47B 47/021 | |
| 9,380,875 B2 * | 7/2016 | Caldwell | A47B 96/021 | |
| 9,386,855 B2 * | 7/2016 | Sabounjian | A47B 96/14 | |
| 10,299,594 B2 * | 5/2019 | Liss | A47B 47/027 | |
| 2005/0055967 A1 | 3/2005 | Kariakin | | |
| 2010/0026156 A1 * | 2/2010 | Leconte | A47B 96/021 | 312/408 |
| 2011/0042336 A1 * | 2/2011 | Cheng | A47B 57/40 | 211/153 |
| 2017/0280875 A1 * | 10/2017 | Buckley | A47B 47/021 | |
| 2018/0279782 A1 * | 10/2018 | Liss | A47B 47/027 | |

\* cited by examiner

FORMED SUPPORT MEMBER WITH TAB SECURING FEATURE

BACKGROUND

Storage systems are used in warehouses, department stores, and storage facilities to store products thereon. The storage systems containing a plurality of storage racks may hold and support large amounts and often heavy materials. Storage racks often employ a number of vertical columns that are sturdily positioned on a base or floor, and then a plurality of horizontal supporting beams may connect to and be fastened to the vertical columns. Directly above the horizontal supporting beams and substantially perpendicular to the horizontal supporting beams, a number of support members can be used to provide a storage surface for shelves, pallets, mesh, etc. All of these components operate together in order to adequately support heavy weight of the materials. For example, the support members need to be structurally steady and easy to manufacture. However, the support members may at times loosen or support so much weight that the support members begin to rotate, thereby hindering the ability of the storage rack to evenly and reliably support objects and other materials.

SUMMARY

A formed support member having a tab securing feature that is structurally steady and easy to manufacture is disclosed herein.

A formed support member comprises a downwardly facing U-shaped body elongated in an axial direction to form a storage surface, a first flat end extended from the U-shaped body in one direction along the axis and in the same horizontal plane defined by the storage surface, a first securing tab having one end integrally connected to the first flat end and another end extended downwardly to receive at least partially a first support surface of a first supporting beam, a second flat end extended from the U-shaped body in an opposite direction of the first flat end and in the same horizontal plane defined by the storage surface, and a second securing tab having one end integrally connected to the second flat end and another end extended downwardly to receive at least partially a second support surface of a second supporting beam.

DETAILED DESCRIPTION

The present disclosure may be understood more readily by reference to the following detailed description of the disclosure taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying drawings.

Figure 1:
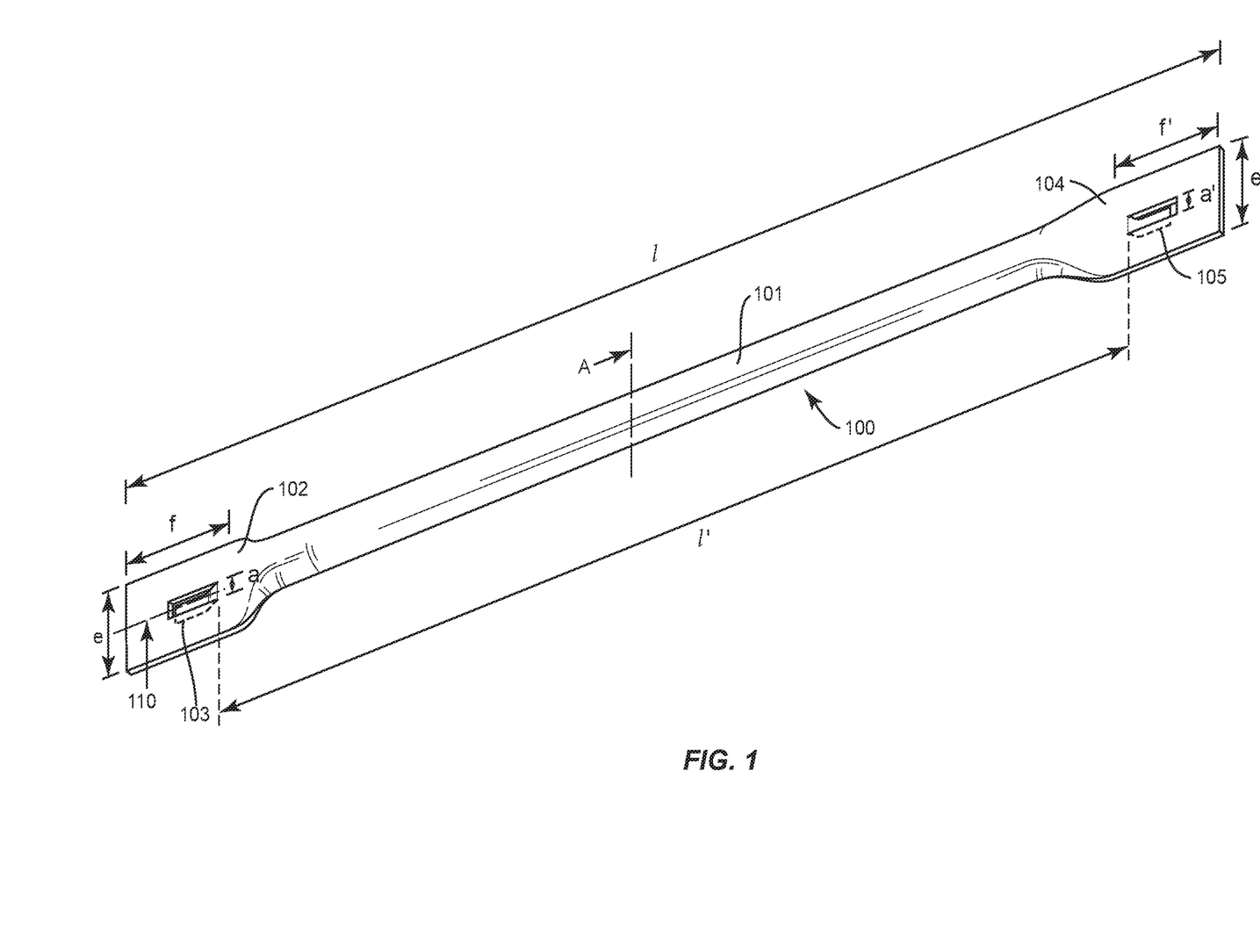
FIG. 1 illustrates a first embodiment of a formed support member of a storage rack in accordance with aspects of the present disclosure.

FIG. 1 illustrates a first embodiment of a formed support member in accordance with aspects of the present disclosure. The formed support member includes a downwardly facing U-shaped body 100 elongated in an axial direction to form a storage surface 101. A first flat end 102 extends from the U-shaped body 100 in one direction along the axis and in the same horizontal plane defined by the storage surface 101. Located in the middle of the first flat end 102 and along the center axis is a first securing tab 103 formed by punching a substantially rectangular area of the first flat end 102 downwardly leaving one end integrally connected to the first flat end 102 and another end extended downwardly to receive at least partially a first support surface of a first supporting beam.

On the opposite direction of the first flat end 102, a second flat end 104 extends from the U-shaped body 100 in the same horizontal plane defined by the storage surface 101. Located in the middle of the second flat end 104 and along the center axis is a second securing tab 105 formed by punching a substantially rectangular area of the flat end 104 downwardly leaving one end integrally connected to the second flat end 104 and another end extended downwardly to receive at least partially a second support surface of a second supporting beam.

The length l of the formed support member is defined by the shortest distance from the left end of the first flat end 102 to the right end of the second flat end 104. The length l can be any length that is suitable for the present application so that the formed support member is sufficiently long to reach the underneath support beams on both the first flat end 102 and the second flat end 104 and sufficiently strong to support the storage rack. For example, the length l can be in the range of from 2 to 44 inches, preferably, from 12 to 20 inches. The length l can be shorter or longer than the specifically recited ranges depending on the dimensions of the storage rack, the weight of the load, the material of the formed support member and other unrecited factors. Even for the same storage rack, the length l can be flexible as long as the first flat end 102 and the second flat end 104 are sufficient long to hold on to the underneath support beam.

The length l' of the formed support member is defined by the shortest distance from the intersectional line defined by the first flat end 102 and the first securing tab 103 to the intersectional line defined by the second flat end 104 and the second securing tab 105. The length l' can be any length that is suitable for the present application so that the formed support member, especially the U-shaped body 100, is sufficiently strong to support the storage rack. The length l' is by definition smaller than the length l. For example, the length l' can be in the range of from 1 to 43 inches, preferably, from 11 to 19 inches. The length l' can be shorter or longer than the specifically recited ranges depending on the dimensions of the storage rack, the weight of the load, the material of the formed support member and other unrecited factors.

The length f of the first flat end 102 is the length of the straight edge of the first flat end 102 which is parallel to the axis of the formed support member. The length f' of the second flat end 104 is the length of the straight edge of the second flat end 104 which is parallel to the axis of the formed support member. The length f and f' can be any length that is suitable for the present application. For example, the length f and f' can be in the range of from 1 to 10 inches, preferably, from 2 to 6 inches. The length f and f' can be shorter or longer than the specifically recited ranges depending on the dimensions of the storage rack, the weight of the load, the material of the formed support member and other unrecited factors.

The width e of the first flat end 102 is the length of the straight edge of the first flat end 102 which is perpendicular to the axis of the formed support member. The width e' of the second flat end 104 is the length of the straight edge of the second flat end 104 which is perpendicular to the axis of the formed support member. The width e and e' can be any length that is suitable for the present application. For example, the width e and e' are in the range of from 1 to 10 inches, and preferably, from 2 to 6 inches. The width e and e' can be shorter or longer than the specifically recited ranges depending on the dimensions of the storage rack, the weight of the load, the material of the formed support member and other unrecited factors.

The width a of the first securing tab 103 is the length of the intersectional line defined by the first flat end 102 and the first securing tab 103 which is perpendicular to the axis of the formed support member. The width a' of the second securing tab 105 is the length of the intersectional line defined by the second flat end 104 and the second securing tab 105 which is perpendicular to the axis of the formed support member. The width a and a' can be any length that is suitable for the present application. For example, the width a and a' can be in the range of from 0.1 to 2 inches, and preferably, from 0.1 to 1.5 inches. The width a and a' can be shorter or longer than the specifically recited ranges depending on the dimensions of the storage rack, the weight of the load, the material of the formed support member and other unrecited factors. In particular, large storage rack may require longer width a and a' to provide stronger support for a heavy load.

Figure 2:
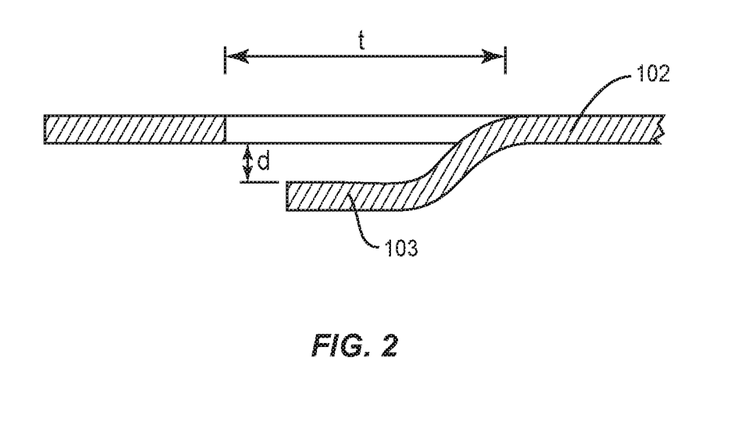
FIG. 2 illustrates one embodiment of an enlarged fragmentary section view of a first securing tab and a first flat end viewed from the direction of arrow 110 in FIG. 1.

FIG. 2 illustrates an enlarged fragmentary section view of the first securing tab 103 and the first flat end 102 viewed from the direction of arrow 110 in FIG. 1. The first securing tab 103 is formed by punching and cutting out a substantially rectangular area of the first flat end 102 downwardly. The tab has one end still integrally connected to the first flat end 102 and another end extended downwardly to receive at least partially a first support surface of a first supporting beam. The shape of the securing tab can be curved or L-shaped, see FIG. 3 which illustrates a L-shaped securing tab 106. The securing tab needs to be punched out with enough force to leave sufficient space to receive the support surface of the underneath supporting beam.

Figure 3:
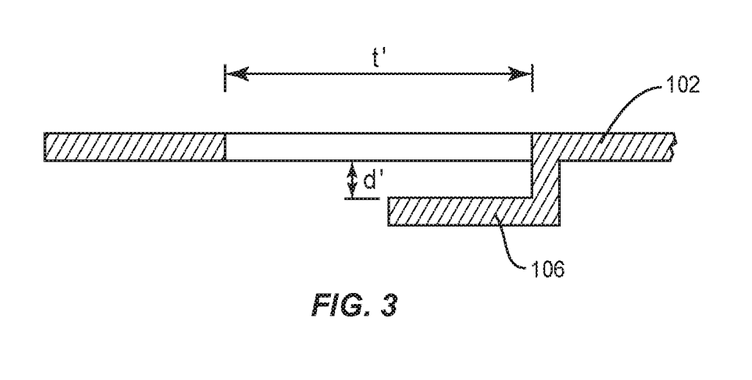
FIG. 3 illustrates another embodiment of an enlarged fragmentary section view of a first securing tab and a first flat end viewed from the direction of arrow 110 in FIG. 1.

The distance d in FIG. 2 is defined by the maximum straight distance between the securing tab 103 and the plane defined by the first flat end 102. The distance d' in FIG. 3 is defined by the maximum straight distance between the securing tab 106 and the plane defined by the first flat end 102. The distance d and d' are in the range of from 0.1 to 2 inches, and preferably, from 0.1 to 1.5 inches. The distance d and d' can be shorter or longer than the specifically recited ranges depending on the dimensions of the storage rack, the weight of the load, the material of the formed support member and other unrecited factors.

The straight length of the securing tab t in FIG. 2 and t' in FIG. 3 are defined by the straight distance between the intersectional line defined by the first flat end 102 and the first securing tab 103 and the left end of the empty space of the substantially rectangular area on the first flat end 102. The length t and t' are in the range of from 0.1 to 4 inches, and preferably, from 0.1 to 3 inches. The length t and t' can be shorter or longer than the specifically recited ranges depending on the dimensions of the storage rack, the weight of the load, the material of the formed support member and other unrecited factors.

Figure 4:
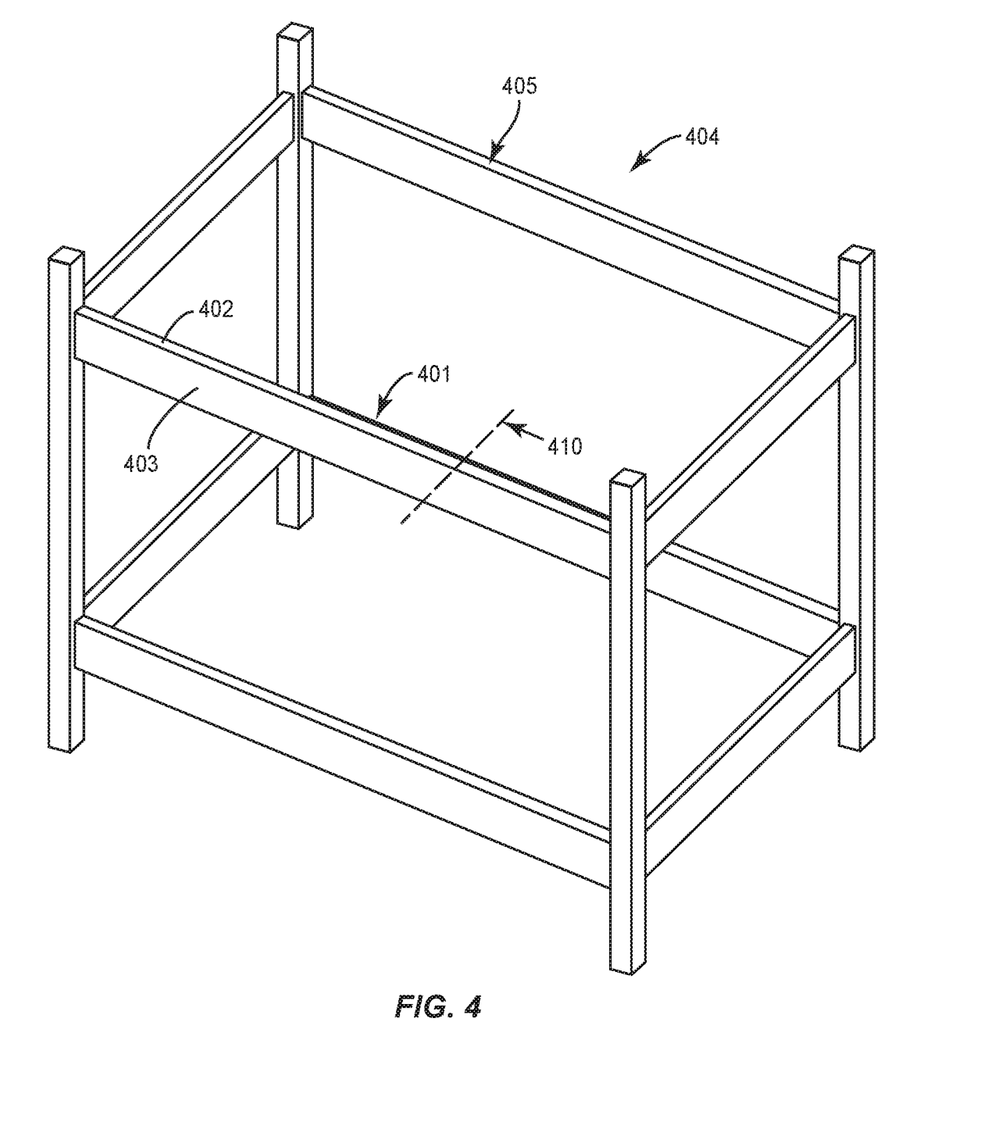
FIG. 4 illustrates a storage rack having two supporting beams on which a formed support member in accordance with aspects of the present disclosure can be used.

FIG. 4 illustrates a storage rack having two supporting beams on which a formed support member in accordance with aspects of the present disclosure can be used. The first support beam 401 has a first support surface 402 along a longitudinal axis and a first side surface 403 substantially perpendicular to the first support surface 402. The second support beam 404 has a second support surface 405 along a longitudinal axis and a second side surface (not shown in FIG. 4) substantially perpendicular to the second support surface 405.

Figure 5:
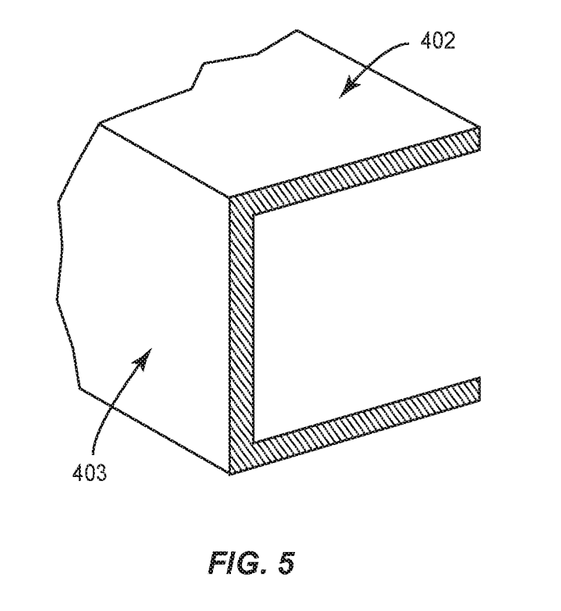
FIG. 5 illustrates an enlarged fragmentary view of a supporting beam from the direction of arrow 410 in FIG. 4.

FIG. 5 illustrates an enlarged fragmentary view of the first supporting beam 401 from the direction of arrow 410 in FIG. 4. FIG. 5 illustrates the cross-section view of the first supporting beam having the first support surface 402 and the first side surface 403.

In one embodiment of the present invention, a formed support member is first placed on top of two supporting beams at an acute or obtuse angle, then rotate to right angle so that the first supporting beam 401 is directly underneath the first flat end 102 and the second supporting beam 404 is directly underneath the second flat end 104. Once in position, the first securing tab 103 receives at least partially the first support surface 402 of the first supporting beam 401, and the second securing tab 105 receives at least partially the second support surface 405 of the second supporting beam 404. Therefore, the formed support member is securely fixed to the underneath supporting beams by two securing tabs.

Figure 6:
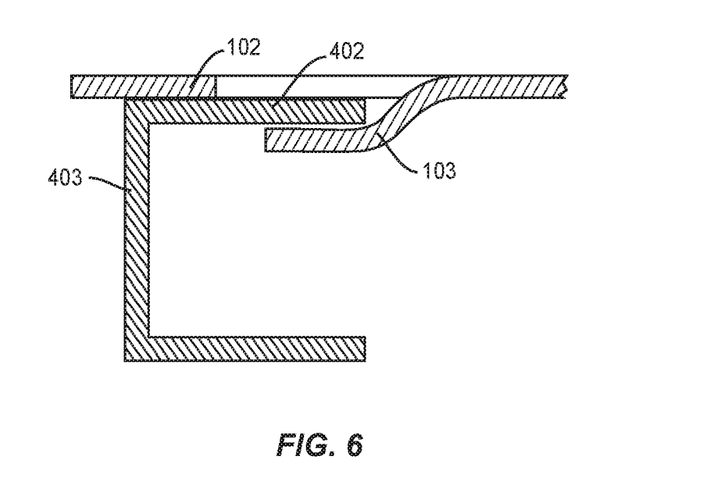
FIG. 6 illustrates an enlarged fragmentary section view of one embodiment of a supporting beam being partially embraced by a curved securing tab and a flat end.

FIG. 6 illustrates an enlarged fragmentary section view of a supporting beam being partially embraced by the curved securing tab 103 and the first flat end 102 of the formed support member. The curved securing tab is easier to manufacture, has more flexibility in receiving different supporting beam having different support surface thickness.

Figure 7:
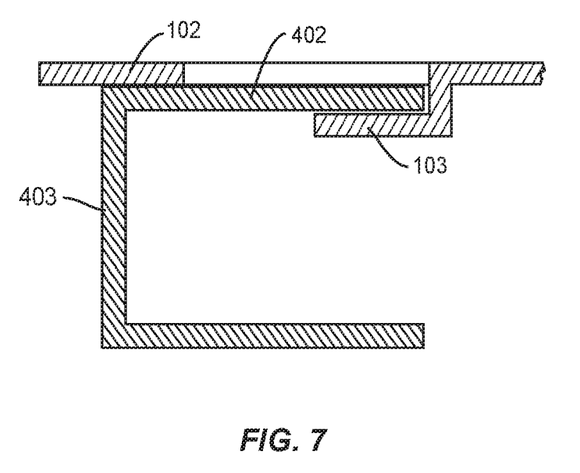
FIG. 7 illustrates an enlarged fragmentary section view of another embodiment of a supporting beam being partially embraced by a L-shaped securing tab and a flat end.

FIG. 7 illustrates an enlarged fragmentary section view of a supporting beam being partially embraced by the L-shaped securing tab 103 and the first flat end 102. The L-shaped securing tab provides tight fit between the supporting beam and the formed support member.

Figure 8:
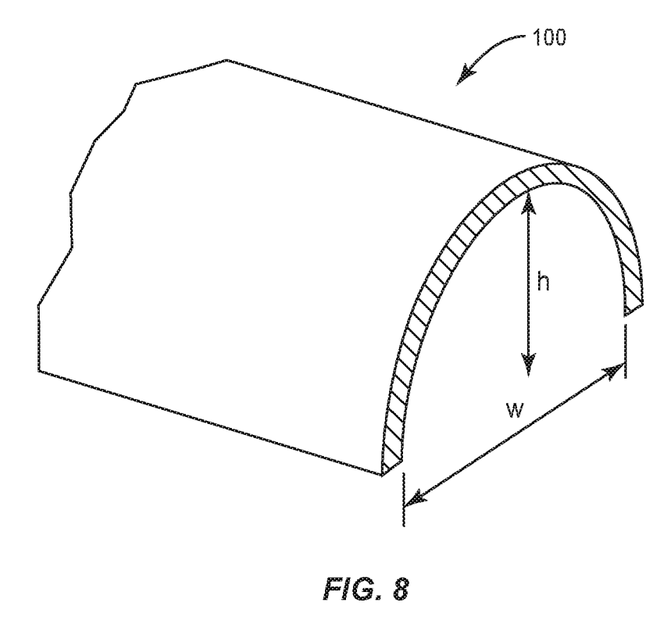
FIG. 8 illustrates a cross sectional view of a formed support member showing the U-shaped body.

FIG. 8 illustrates a cross sectional view along plane A (see FIG. 1) of a formed support member showing the downwardly facing U-shaped body. The cross section has a width w in the range of from 0.1 to 6 inches and a height h in the range of from 0.1 to 10 inches. The width w and the height h can be shorter or longer than the specifically recited ranges depending on the dimensions of the storage rack, the weight of the load, the material of the formed support member and other unrecited factors.

The formed support member can be fabricated from suitable materials, including, but not limited to, metal(s), alloy(s), or combinations thereof, etc. Suitable metals include aluminium, copper, iron, tin, lead, titanium, zinc and etc. Suitable alloys including steel, solder, brass, pewter, duralumin, bronze, amalgams and etc. The formed support member may be fabricated from a single material or a combination of materials, including, but not limited to, the above exemplary materials, to achieve various desired characteristics such as strength, rigidity, performance and durability.

The present disclosure is advantageous because the formed support member is universal in that a single structural member may be manufactured and adaptable for multiple sizes of storage racks. In particular, storage racks that have horizontal support beams that are three inches, four inches, or three and a half inches may be utilized. Thus, the ability to use the same formed support member for each sized storage rack provides for easier manufacturing and predictability in terms of making the support member.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

The invention claimed is:

1. A formed support member comprising:
   a unitary body formed into an elongated central support portion having first and second ends, with a first flat end and a second flat end extending from the first and second ends of the central support portion, respectively;
   the central support portion formed as a downwardly facing U-shaped body elongated in an axial direction, the U-shaped body having a curved, dome-shaped cross section with a downwardly pointing apex on a bottom side and a support surface on a top side;
   the first flat end extending from the first end of the central support portion in a first direction along the axis and in the same horizontal plane defined by the support surface;
   the first flat end formed with a first securing tab having one end integrally connected to the first flat end and another end extending downwardly and in the first direction, to define a gap between a top of the first securing tab and a bottom of the first flat end, the gap adapted to receive at least partially a first supportive surface of a first supporting beam;
   the second flat end extending from the second end of the central support portion in a second direction, opposite the first direction of the first flat end and in the same horizontal plane defined by the support surface; and
   the second flat end formed with a second securing tab having one end integrally connected to the second flat end and another end extending downwardly and in the second direction, to define a gap between a top of the second securing tab and a bottom of the second flat end, the gap adapted to receive at least partially a second supportive surface of a second supporting beam.

2. The formed support member of claim 1, wherein the first securing tab is in a curved shape.

3. The formed support member of claim 2, wherein the second securing tab is in a curved shape.

4. The formed support member of claim 1, wherein the first securing tab is in a L-shape.

5. The formed support member of claim 4, wherein the second securing tab is in a L-shape.

6. The formed support member of claim 1, wherein the length of the formed support member is in the range from 12 to 20 inches and the first and second flat ends are in the range from 2 to 6 inches.

7. The formed support member of claim 6, wherein the transition from the central support portion to the first and second flat ends is curved and the first and second securing tabs have a curved shape.

8. The formed support member of claim 1, wherein the formed support member is prepared from metals, alloys or combinations thereof.

9. The formed support member of claim 1, wherein the central support portion has a uniform cross section.

10. The formed support member of claim 1, wherein the transition from the central support portion to the first and second flat ends is curved.

11. The formed support member of claim 1, wherein first and second gaps face in opposite directions, along the axis of the formed member.

12. A storage system comprising:
    a storage rack comprising a first supporting beam having a first support surface and a second supporting beam having a second support surface; and
    at least one formed support member comprising:
      a downwardly facing U-shaped body having a curved, dome-shaped cross section with a curved apex at the downward position, elongated in an axial direction to form a storage surface;
      a first end of the support member shaped into a first flat end extended from the U-shaped body in a first direction along the axis and in the same horizontal plane defined by the storage surface;
      a first securing tab having one end integrally connected to the first flat end and another end extended downwardly and in the first direction and configured to receive at least partially the first support surface of the first supporting beam;
      a second end of the support member shaped into a second flat end extended from the U-shaped body in a second direction in an opposite direction of the first direction and in the same horizontal plane defined by the storage surface; and
      a second securing tab having one end integrally connected to the second flat end and another end extended downwardly in the second direction and configured to receive at least partially the second support surface of the second supporting beam.

13. The storage system of claim 12, wherein the first securing tab is in a curved shape.

14. The storage system of claim 13, wherein the second securing tab is in a curved shape.

15. The storage system of claim 12, wherein the first securing tab is in a L-shape.

16. The storage system of claim 15, wherein the second securing tab is in a L-shape.

17. The storage system of claim 12, wherein the length of the formed support member is in the range from 12 to 20 inches and the first and second flat ends are in the range from 2 to 6 inches.

18. The storage system of claim 17, wherein the transition from the downwardly facing U-shaped portion to the first and second flat ends is curved and the first and second securing tabs have a curved shape.

19. The storage system of claim 12, wherein the formed support member is prepared from metals, alloys or combinations thereof.

* * * * *